Patented Apr. 8, 1947

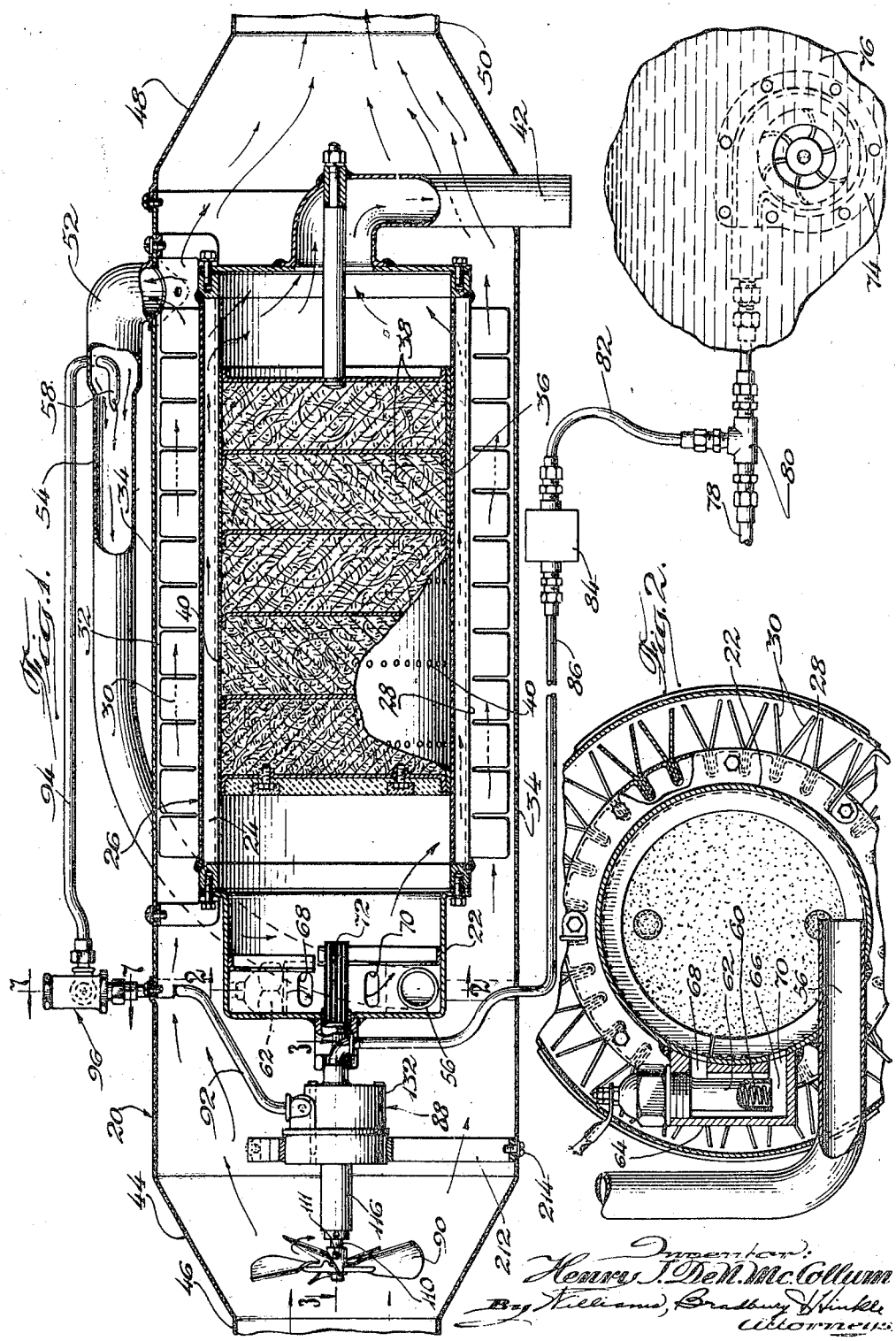

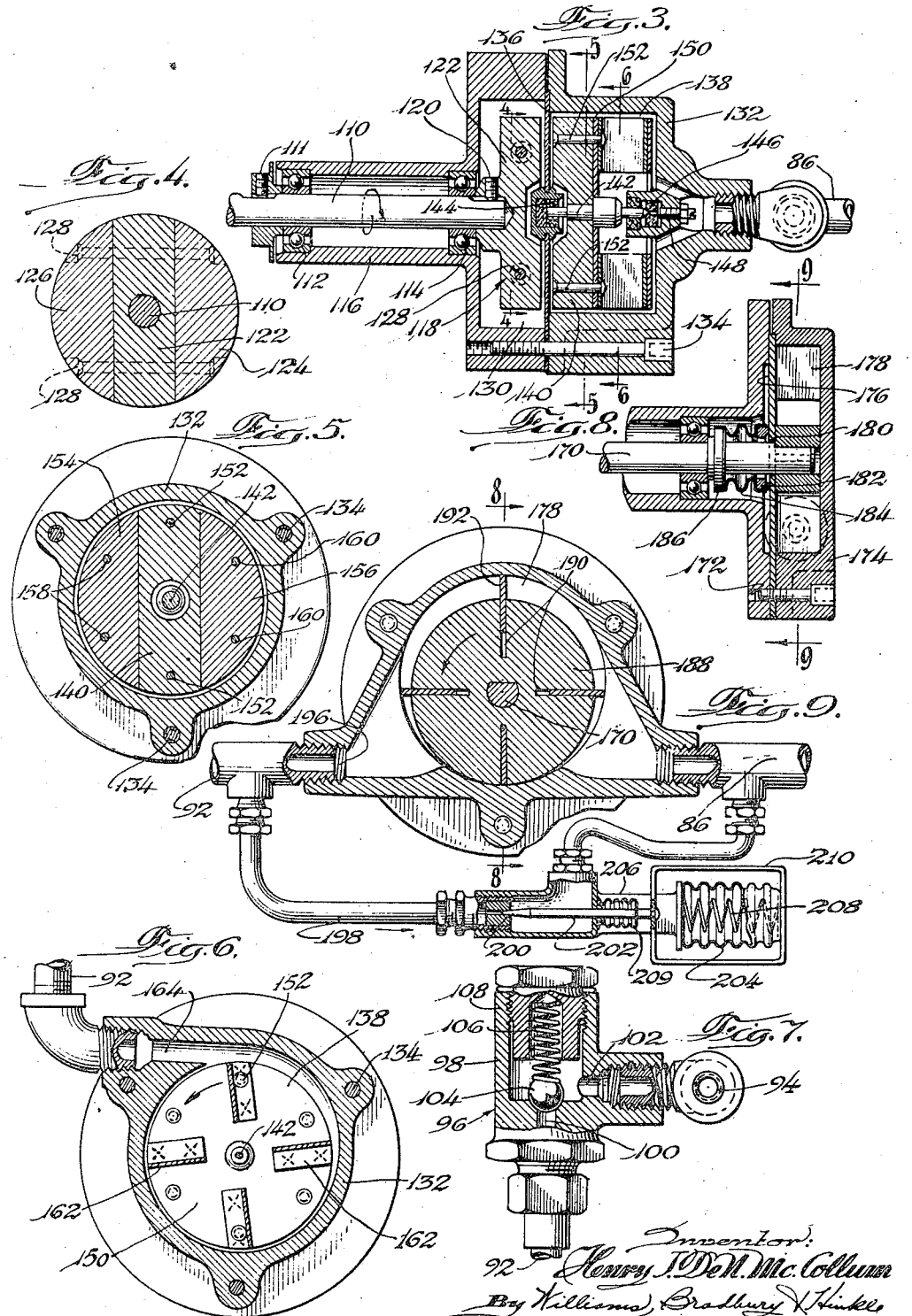

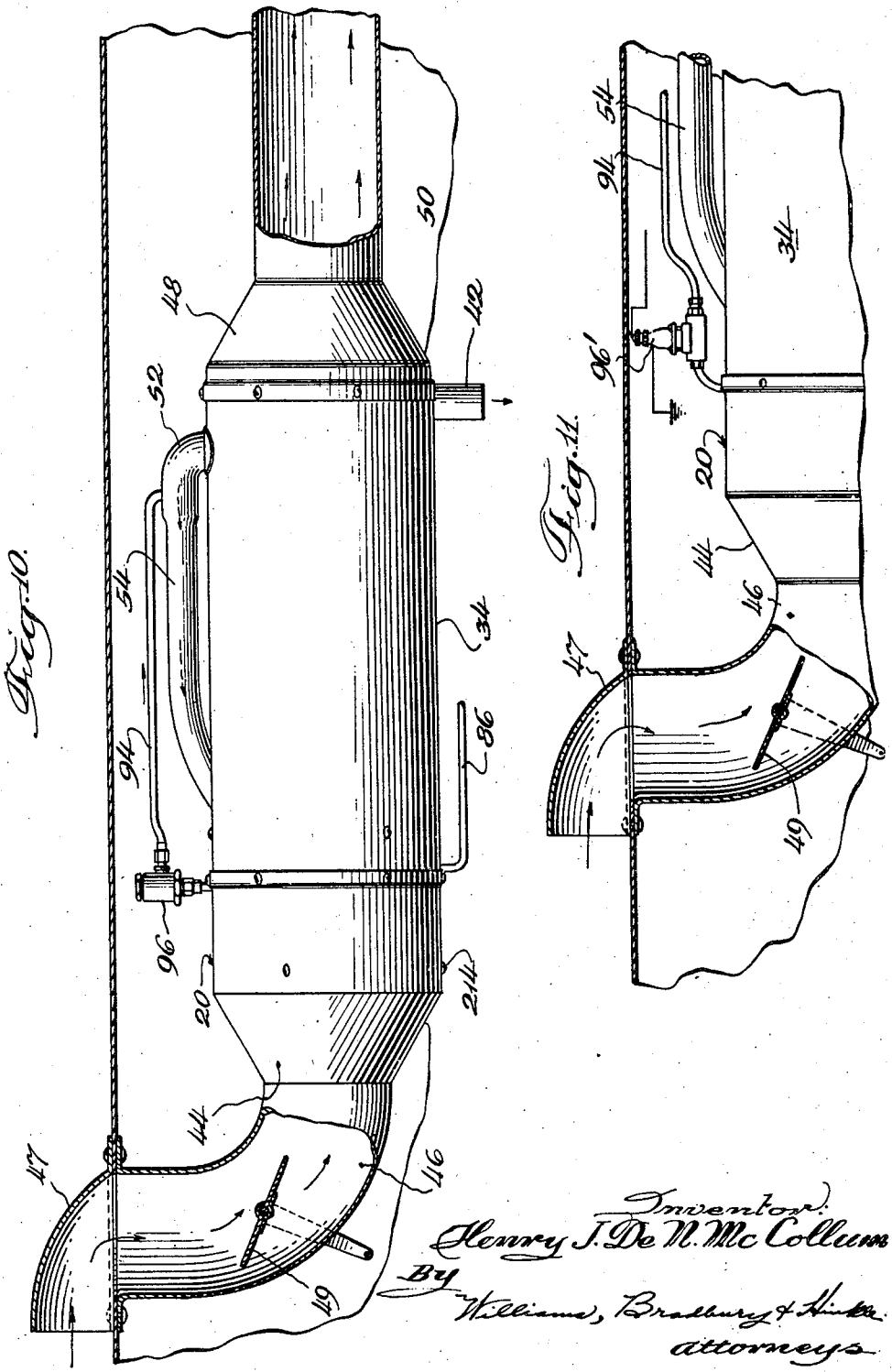

2,418,720

UNITED STATES PATENT OFFICE 2,418,720

AIRCRAFT HEATER WITH AIR-DRIVEN FUEL PUMP

Henry J. De N. McCollum, Chicago, Ill.; Thelma McCollum, executrix of said Henry J. De N. McCollum, deceased, assignor to Stewart-Warner Corporation, Chicago, Ill., a corporation of Virginia Application May 10, 1943, Serial No. 486,361

5 Claims. (Cl. 126—116)

My invention relates to aircraft heaters and more particularly to aircraft heaters of the internal combustion type.

An object of my invention is to provide a new and improved aircraft heater wherein the fuel delivered to the combustion chamber of the heater bears the proper relation to the rate of flow of ventilating air through the heater.

Another object of my invention is to provide a new and improved heater which is adapted to be supplied with fuel from the booster pump which supplies fuel to an engine of the aircraft and wherein provision is made to vary the fuel supply to the heater in accordance with its individual needs independently of the needs of the aircraft engine.

Another object of my invention is to provide a new and improved aircraft heater wherein the fuel supply to the combustion chamber of the heater is automatically varied in accordance with heater needs and is automatically turned on and off by merely turning on or shutting off the supply of ventilating air to the heater.

Another object of my invention is to provide a ram operated heater wherein the fuel supply to the heater is automatically controlled by controlling the air delivery from the ram to the heater.

Another object of my invention is to provide a heater having new and improved pumping means for supplying fuel to the combustion chamber of the heater.

Another object of my invention is to provide a heater having new and improved fuel supply means.

Other objects and advantages will become apparent as the description proceeds.

In the drawings:

Fig. 1 is a diagrammatic representation of a heater installation embodying my invention and shows the heater in longitudinal section;

Fig. 2 is a transverse, sectional view of the heater taken on the line 2—2 of Fig. 1;

Fig. 3 is a longitudinal, sectional view through the fuel pumping means and is taken on the line 3—3 of Fig. 1;

Fig. 4 is a transverse, sectional view of the driving magnetic assembly and is taken on the line 4—4 of Fig. 3;

Fig. 5 is a transverse, sectional view of the pumping mechanism taken on the line 5—5 of Fig. 3;

Fig. 6 is a transverse, sectional view through the pumping mechanism and is taken on the line 6—6 of Fig. 3;

Fig. 7 is a sectional view through a loaded check valve taken on line 7—7 of Fig. 1;

Fig. 8 is a longitudinal, sectional view through a modified form of fuel pump;

Fig. 9 is a transverse, sectional view of the fuel pump of Fig. 8 and is taken on the line 9—9 of this figure;

Fig. 10 is a view similar to Fig. 1 but showing the heater in side elevation and indicating more clearly the manner in which this heater supplies heated air to the duct leading to the cabin of the aircraft; and Fig. 11 is a fragmentary view similar to Fig. 10, but showing a modified form of my invention in which a solenoid fuel control valve is substituted for the check valve of the form shown in Fig. 10.

That embodiment of my invention shown in Figs. 1 to 7, inclusive, comprises a heater indicated generally by reference numeral 20 having a combustion chamber 22 which supplies hot products of combustion to the gas passages 24 in a heat exchanger indicated generally by reference numeral 26. The heat exchanger 26 comprises a corrugated cylindrical shell 28 having fins 30 clamped between the corrugations thereof. These fins project into a ventilating air passage 32 formed between the shell 28 and a cylindrical casing 34 which encloses the combustion chamber 22 and heat exchanger 26.

The gas passages 24 are formed between the outermost portions of the shell 28 and a muffler 36 formed of sheet metal construction and divided into compartments 38 containing glass wool or stainless steel wool or similar sound absorbing material. An annular row of small openings 40 forms acoustic couplings between each compartment and the gas passages 24. As the hot gases traverse the passages 24, they give up their heat to the shell 28 and fins 30 and the cooled gases leave the righthand end of the passages 24 to enter an exhaust pipe 42 through which they are discharged to atmosphere.

The lefthand end of the heater casing 34 is tapered, as indicated at 44, and connects with a pipe 46 leading from a ram, blower, or other suitable source of supply. In Fig. 10 I have shown a typical installation in which the ram 47 supplies ventilating air to the heater and wherein a shutter or valve 49 is provided to shut off completely or vary in any suitable manner the flow of ventilating air to the heater. A heater installation having such a ram and variable shutter is shown in my co-pending application Serial No. 413,463, filed October 3, 1941, now Patent No. 2,364,458 issued December 5, 1944. This ventilating air passes over the combustion chamber 22 and fins 30 and absorbs heat therefrom. The heated ventilating air passes from the righthand end of the casing 34 into a tapered outlet 48 communicating with a pipe 50 leading to the aircraft cabin or other space or spaces to be heated.

Part of the heated air is diverted into a pipe 52 connected to an induction tube 54 having a discharge end 56 located in the lefthand end of the combustion chamber and so positioned as to deliver a mixture of fuel and air to this chamber in a direction tangential to the circular wall thereof. A jet 58 supplies fuel to the inlet end of the induction pipe 54 and the fuel and air mixture delivered to the combustion chamber is ignited by a coil 60 forming part of an igniter plug 62 threaded into a housing 64 attached to the wall of the combustion chamber. This housing provides a pocket 66 which communicates with the interior of the combustion chamber by way of inlet 68 and outlet 70. This igniter is ordinarily disconnected from its source of current after the heater attains normal operating temperature and a re-igniter 72 is provided to maintain combustion thereafter.

Fuel is supplied to the jet 58 from the main fuel tanks of the aircraft by means of the booster pump which furnishes such fuel to the aircraft engine. In Fig. 1, I have illustrated such a booster pump 74 as being located in a fuel tank 76 and supplying fuel to a pipe line 78 leading to an engine of the aircraft. A T 80 is located in this fuel line and a pipe 82 connects this T with a pressure regulator 84 of conventional type for maintaining a predetermined absolute pressure in a conduit 86 leading to a fuel pump indicated generally by reference numeral 88. This fuel pump 88 is driven by an air driven impeller 90 located in the tapered inlet 44 of the heater casing and functions to supply fuel to the jet 58 by way of pipes 92 and 94 and past check valve 96.

The valve 96 is best shown in Fig. 7 and comprises a body 98 having an inlet port 100 and an outlet 102. The inlet port 100 is in communication with pipe 92 leading from pump 88 and is normally closed by a ball check 104 urged against the inlet port by a spring 106. This spring is seated in a recess formed in a plug 108 threaded into the upper end of the body 98 and the tension of this spring is so adjusted that a pressure greater than that provided by the pressure regulator 84 is necessary to open the valve. Pump 88 provides the necessary additional pressure to open this valve and force fuel to the heater jet 58, but no fuel is supplied to this jet except when the pump 88 is being driven by its impeller 90.

When heat is desired and the ram is permitted to supply air to the inlet end of the heater casing, the inflow of air rotates impeller 90, which in turn drives pump 88 to force fuel past valve 96 and thence to jet 58. The pump 88 may be of any suitable type, but a pump and driving means therefor which are particularly advantageous for this use are shown in detail in Figs. 3, 4, 5 and 6. Referring to these latter figures, it will be seen that the impeller 90 is mounted on one end of a driving shaft 110 by a set screw 111 and this shaft is supported in roller bearings 112 and 114 carried by a housing 116. A magnetic driving assembly 118 is attached to the other end of shaft 110 by means of a set screw 120.

This magnetic assembly comprises a permanent magnet 122 to which is attached non-magnetic members 124 and 126 by means of rivets 128. This magnetic assembly 118 rotates in a circular recess 130 in the housing 116 and the circular configuration of the assembly 118 prevents such rotation from creating unnecessary air currents in the recess.

The housing 116 is secured to a second housing 132 by bolts 134 and a non-magnetic diaphragm 136 is clamped between the housings and serves to seal the otherwise open end of a pumping chamber 138 formed in the housing 132. The pump rotor is mounted in this pumping chamber 138 and comprises a permanent magnet 140 mounted on a shaft 142 having one end supported in a bearing 144 carried by the diaphragm 136 and a second end supported in a bearing 146 mounted in the housing 132. The bearing 146 is provided with a screw adjustment 148, which is accessible through the inlet opening to which the pipe 86 is attached.

A non-magnetic plate 150 is secured to the magnet 140 by rivets 152 and non-magnetic members 154 and 156 are secured to the plate 150 by rivets 158 and 160. Vanes or blades 162 are welded to the plate 150. The pumping chamber 138 is provided with a tangentially arranged outlet 164 in communication with the pipe 92 leading to the valve 96. The housings 116 and 132 are preferably die cast of non-magnetic material.

When the impeller is driven by air entering the inlet end of the heater casing, this impeller rotates shaft 110 and magnetic assembly 118. Magnet 140 rotates with magnet 122 of assembly 118, thereby causing a rotation of the blades or vanes 162 and creating a whirling motion in the fuel in the pump chamber 138. The pump, therefore, comprises a centrifugal pump which increases the pressure of the fuel and forces it past the check valve 96. The pump and driving mechanism just described is particularly desirable in that the plate 136 effectively seals the open end of housing 132 and no packing glands or similar means are required to seal around rotating shafts projecting into the pump chamber.

In Figs. 8 and 9, I have shown a modified form of pump and driving means therefor, comprising a shaft 170 which is adapted to have the fan 90 attached to one end thereof. This shaft is supported in roller bearings carried by a housing 172 to which a second housing 174 is secured by bolts, or in any other suitable manner. A diaphragm 176 is clamped between the housings 172 and 174 and partially closes the open end of a pumping chamber 178 formed in the housing 174. The plate 176, however, has an opening 180 through which the shaft 170 projects. This opening is sealed against escape of fuel by a rotating ring 182 having a narrow annular edge engaging the plate 176. This ring is carried in one end of a resilient Sylphon 184 and the other end of this Sylphon is attached to a flange 186 which may form an integral part of the shaft 170.

A pump rotor 188 is located in the chamber 178 and rotates with the shaft 170. This rotor 188 has slots 190 for vanes 192 which slide in these slots as the rotor turns in the eccentric pumping chamber 178. This chamber has a fuel inlet 194 to which the pipe 86 is attached and an outlet 196 to which the pipe 92 is attached.

As the airplane increases its altitude, the air becomes thinner and unless altitude compensating means is provided, the mixture of fuel and air delivered to the combustion chamber of the heater will become richer. The pump of Figs. 8 and 9 is provided with an altitude compensating bypass 198 to maintain a uniform richness of mixture for all altitudes. This bypass includes a restriction 200 and a needle valve 202 which is moved in and out of this restriction to variably control flow through the bypass.

An evacuated bellows 204 has its lefthand end attached to a bracket 206 and a spring 208 tends to expand the bellows 204. A yoke 210 connects the needle valve 202 with the righthand or movable end of the bellows 208. As atmospheric pressure decreases with increase in altitude, spring 208 expands bellows 204 and moves needle valve 202 to the right, thereby permitting increasing flow through the bypass and thus reducing the quantity of fuel supplied to the heater jet 58. A resilient Sylphon 209 forms a seal between the needle valve 202 and the bypass wall.

The pump housing 116 is supported in a sheet metal frame 212 attached to the heater casing 34 by screws 214. This frame provides a convenient means of mounting the pump and impeller in the inlet end of the heater casing, although any other suitable mounting means may be provided. The particular combustion chamber, heat exchanger and muffler disclosed herein are claimed in my copending applications, Serial Nos. 477,080, filed February 25, 1943; 476,266, filed February 18, 1943 and now Patent No. 2,404,646; and 478,259, filed March 6, 1943, and other types of combustion chambers, heat exchangers and mufflers may be used in lieu of the particular ones shown herein.

While the loaded check valve 96 constitutes a convenient and effective means for preventing flow of fuel to the jet 58 when no ventilating air is flowing through the heater, this check valve may be replaced by a solenoid valve which is energized whenever the heater is operated. Such a solenoid valve is indicated by reference character 96' in Fig. 11. The jet 58, to which the fuel is supplied, discharges this fuel into the air flowing through the induction tube 54 under pump pressure and requires no restriction in this tube to create a suction at the jet outlet.

Such a jet arrangement is especially desirable, since it permits freer flow to the combustion chamber, whereas the usual carburetor, with its restrictive Venturi tube, would increase the pressure drop between the combustion chamber and the outlet end of the heat exchanger. While any increase in pressure drop is undesirable, a carburetor could be substituted for the jet arrangement shown in the drawings and my invention is to be considered as contemplating the substitution of a carburetor for the jet 58 whenever the use of a carburetor is desired. In the drawings, I have shown all fuel as being supplied to a single jet, but it is to be understood that two or more jets may be utilized in lieu of the single jet shown in the drawing for illustrative purposes.

In the drawings, I have shown the heater as being supplied with fuel from the booster pump which is primarily provided for the purpose of furnishing fuel to the airplane engine or engines. This booster pump provides a convenient source of fuel for the heater, but whenever it is more desirable to do so, a separate source of fuel may be provided for the heater and such separate source of fuel may take any desired form, such for example, as a fuel tank from which the fuel flows by gravity to the impeller driven pump 132. Where such a fuel supply is provided, it will usually be preferable to substitute an ordinary solenoid valve for the loaded check valve 96 shown in Fig. 1 of the drawings.

An important feature of my invention lies in the fact that the fuel supplied to the heater is proportional to the rate of air flow through the heater. If this air flow is decreased by partly or completely closing or cutting off the ram which supplies air to the heater, or by partly or completely closing any or all shutter mechanism interposed between the outlet end of the heater and the space or spaces into which the heated air is discharged, the fuel supply for the heater will be correspondingly reduced so that the quantity of fuel consumed by the heater is never more than that necessary properly to heat the quantity of ventilating air which is flowing through the heater at any given time. This regulation of the fuel supply is entirely automatic and requires no effort or attention on the part of the pilot or crew of the airplane.

It is to be understood that my invention is not limited to the particular details shown and described, but may assume numerous other forms and that the scope of my invention includes all modifications and variations coming within the scope of the appended claims.

I claim:

1. An aircraft heater of the class described, comprising means forming a combustion chamber, an induction tube for supplying combustible mixture to said chamber, a jet for supplying fuel to said combustion chamber, a heat exchanger receiving hot products of combustion from said combustion chamber, a casing enclosing said combustion chamber and heat exchanger, said casing having a tapered end adapted to be connected with a ram, said casing also having an outlet through which at least most of the air supplied by said ram is discharged as heated air for ventilating purposes, piping means for connecting said jet with a booster pump for supplying fuel to an airplane engine, a pressure regulator in said piping means for limiting the pressure created by said booster pump to an absolute maximum, a check valve interposed between said pressure regulator and said jet and openable only under a pressure greater than said absolute maximum pressure, a pump in said casing interposed between said pressure regulator and said valve and operable to force fuel past said valve to said jet, and an impeller responsive to air flowing through said casing for driving said pump at different speeds varying with the rate of air flow.

2. An aircraft heater of the class described, comprising a cylindrical casing connected to a source of air for ventilating purposes, said casing having an outlet through which at least most of the air entering said casing is discharged as heated air for ventilating purposes, means forming a combustion chamber located in said casing, a heat exchanger located in said casing and receiving hot gases from said combustion chamber, a pump for supplying fuel to said combustion chamber, an impeller in said casing for driving said pump, said impeller being rotated by ventilating air flowing through said casing, and an altitude controlled bypass for said pump for reducing the quantity of fuel supplied to said combustion chamber at higher altitudes.

3. An aircraft heater of the class described, comprising means forming a combustion chamber, an induction tube for supplying combustible mixture to said chamber, means for supplying fuel to said combustion chamber, a heat exchanger receiving hot products of combustion from said combustion chamber, a casing enclosing said combustion chamber and heat exchanger, piping means for connecting said means with a booster pump for supplying fuel to an airplane engine, a pressure regulator in said piping means for limiting the pressure created by said booster pump to an absolute maximum, a check valve interposed between said pressure regulator and said means and openable only under a pressure greater than said absolute maximum pressure, a pump in said casing interposed between said pressure regulator and said valve and operable to force fuel past said valve to said means, means for causing air to flow through said casing and over said heat exchanger, and an impeller operated by said flowing air to drive said pump at different speeds.

4. An aircraft heater of the class described, comprising a cylindrical casing connected to a source of ventilating air, said casing having an outlet through which at least most of the air entering said casing is discharged as ventilating air, means forming a combustion chamber located in said casing, a heat exchanger located in said casing and receiving hot gases from said combustion chamber, a pump in said casing for supplying fuel to said combustion chamber, an impeller in said casing and variably driven by said ventilating air for driving said pump, a by-pass for said pump for reducing the quantity of fuel supplied to said combustion chamber at higher altitudes, and pressure-responsive means controlling said bypass, said last named means being responsive to variations in atmospheric pressure.

5. A heater of the class described, comprising a tubular casing connected to a source of ventilating air, said casing having an outlet through which at least most of the air entering said casing is discharged as ventilating air, means forming a combustion chamber located therein, a heat exchanger connected to said combustion chamber and receiving hot gases therefrom, a centrifugal pump for supplying fuel to said combustion chamber, means variably operated by said ventilating air for driving said pump, a loaded check valve interposed between said pump and combustion chamber, and means for supplying fuel to said pump at a pressure less than that required to open said check valve, and an altitude HENRY J. De N. McCOLLUM.

REFERENCES CITED

The following references are of record in the file of this patent:

UNITED STATES PATENTS

| Number | Name | Date |
|---|---|---|
| 1,482,759 | Meyers | Feb. 5, 1924 |
| 1,476,971 | Hurd | Dec. 11, 1923 |
| 2,100,673 | Schwander | Nov. 30, 1937 |
| 2,264,347 | Udale | Dec. 2, 1941 |
| 2,009,137 | Keleckner | July 23, 1935 |
| 2,153,379 | Lucas | Apr. 4, 1939 |
| 1,350,095 | Eddison | Aug. 17, 1920 |
| 2,033,577 | Hunter | Mar. 10, 1936 |

Certificate of Correction

Patent No. 2,418,720.   April 8, 1947.

HENRY J. DeN. McCOLLUM

It is hereby certified that error appears in the printed specification of the above numbered patent requiring correction as follows: Column 8, line 14, claim 5, after "altitude" insert the words and period *controlled bypass for said pump.*; and that the said Letters Patent should be read with this correction therein that the same may conform to the record of the case in the Patent Office.

Signed and sealed this 3rd day of June, A. D. 1947.

[SEAL]

LESLIE FRAZER,
*First Assistant Commissioner of Patents.*